United States Patent
Cai

(10) Patent No.: US 12,391,081 B2
(45) Date of Patent: Aug. 19, 2025

(54) HEIGHT SENSOR AND VEHICLE COMPRISING SAME

(71) Applicant: Continental Automotive Technologies GmbH, Hannover (DE)

(72) Inventor: Guozhen Cai, Changchun (CN)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/145,259

(22) Filed: Dec. 22, 2022

(65) Prior Publication Data
US 2023/0202251 A1    Jun. 29, 2023

(30) Foreign Application Priority Data
Dec. 24, 2021  (CN) .......................... 202123289381.4

(51) Int. Cl.
*B60G 7/00* (2006.01)
*B60G 17/019* (2006.01)

(52) U.S. Cl.
CPC ...... *B60G 7/003* (2013.01); *B60G 2204/1162* (2013.01); *B60G 2400/25* (2013.01)

(58) Field of Classification Search
CPC .................. B60G 7/003; B60G 17/019; B60G 2204/116; B60G 2204/1162; B60G 2400/25; B60G 2500/30
See application file for complete search history.

(56) References Cited

U.S. PATENT DOCUMENTS

| | | | |
|---|---|---|---|
| 9,937,766 B1 | 4/2018 | Bobb | |
| 2011/0079977 A1* | 4/2011 | Geiger | B62D 5/12 280/93.51 |
| 2016/0059652 A1* | 3/2016 | Weifenbach | B62D 17/00 280/124.144 |
| 2021/0276386 A1* | 9/2021 | Verbowski | B60G 17/019 |
| 2022/0266943 A1* | 8/2022 | Lv | F16F 1/545 |

FOREIGN PATENT DOCUMENTS

| | | | | |
|---|---|---|---|---|
| CN | 101284488 A | * | 10/2008 | ............ B60G 11/27 |
| CN | 208119351 U | * | 11/2018 | ............... B62L 3/04 |
| CN | 217786226 U | * | 11/2022 | |
| DE | 102014223412 A1 | | 5/2016 | |

OTHER PUBLICATIONS

Description Translation for (DE 102014/223412) from Espacenet (Year: 2014).*
Description Translation for (CN 208119351) from Espacenet (Year: 2018).*
European Search Report dated May 22, 2023 for the counterpart European Patent Application No. 2221128.5.

* cited by examiner

*Primary Examiner* — Jason D Shanske
*Assistant Examiner* — Daniel M. Keck

(57) ABSTRACT

A height sensor including a sensor body, a swing arm and a connecting rod. A first end of the swing arm is movably connected to the sensor body, and a second end of the swing arm is movably connected to the connecting rod. The swing arm is configured as a structure with an adjustable working length suitable for, and can be matched to, different chassis suspension structures, being highly versatile, with a low development cost and high development efficiency.

11 Claims, 3 Drawing Sheets

HEIGHT SENSOR AND VEHICLE COMPRISING SAME

CROSS-REFERENCE TO RELATED APPLICATIONS

The present application claims priority under 35 U.S.C. § 119(a) from Chinese Patent Application No. 202123289381.4 filed on Dec. 24, 2021, in the Chinese Patent Office, the disclosure of which is herein incorporated by reference in its entirety.

BACKGROUND

1. Field

The present application relates to the technical field of sensors, in particular to a height sensor for a motor vehicle and a vehicle comprising the height sensor.

2. Description of Related Art

Height sensors are an important component of motor vehicle lamp or chassis control systems. For example, in a vehicle lamp control system, the height of the vehicle's low beam lamps needs to be controlled promptly according to vehicle body height and the road surface conditions, to prevent the vehicle lamps from causing dazzle, which would compromise drivers' driving safety. Thus, a height sensor needs to be used to detect changes in the vehicle body height (chassis height) in real time. The height sensor is usually mounted at the motor vehicle chassis suspension; when the vehicle body height changes, a swing arm of the height sensor is driven to rotate by a connecting rod that moves in linkage with the suspension, thereby changing the strength of a magnetic field, and a height change signal is outputted after processing by the height sensor.

In existing height sensors, the effective length of the swing arm is generally fixed, so it is not possible to match the sensor to different chassis suspension structures by changing the swing arm length. Swing arms of different lengths need to be developed for different chassis suspension structures, resulting in a large number of swing arm molds, high development costs and poor versatility.

SUMMARY

To overcome the shortcomings in the prior art, the present application provides a height sensor and a vehicle comprising the height sensor. The height sensor is suitable for, and can be matched to, different chassis suspension structures, so is highly versatile with a low development cost.

To achieve the above objective, the present application provides a height sensor, comprising a sensor body, a swing arm and a connecting rod, a first end of the swing arm being movably connected to the sensor body, and a second end of the swing arm being movably connected to the connecting rod; the swing arm is configured as a structure with an adjustable working length.

Preferably, the swing arm further comprises a main arm and an auxiliary arm, one end of the main arm being connected to the auxiliary arm, another end of the main arm being movably connected to the sensor body, and the auxiliary arm also being movably connected to the connecting rod; and the working length of the swing arm is adjusted by adjusting a cooperative connection relationship between the main arm and the auxiliary arm.

Preferably, the cooperative connection relationship between the main arm and the auxiliary arm is a relative assembly angle and/or assembly position between the main arm and the auxiliary arm.

Preferably, a connecting end of the main arm that is connected to the auxiliary arm is provided with a mounting hole, and multiple limiting slots are provided around the mounting hole.

Preferably, the multiple limiting slots are arranged to surround the mounting hole.

Preferably, a fixing shaft and a limiting protrusion are provided on the auxiliary arm; the fixing shaft is connected to the mounting hole in the main arm in a cooperative manner, and the limiting protrusion is connected to the limiting slot on the main arm by engagement; and the working length of the swing arm is adjusted by adjusting an angle of rotation of the auxiliary arm relative to the main arm about the fixing shaft.

Preferably, a ball head or a ball socket is further provided on the auxiliary arm, the ball head or ball socket being movably connected to a ball socket or ball head correspondingly provided on the connecting rod.

Preferably, the positions of the limiting protrusion and the ball head or ball socket on the auxiliary arm are at two sides of the fixing shaft respectively, and the protrusion direction of the ball head or ball socket on the auxiliary arm is opposite to the protrusion direction of the limiting protrusion and the fixing shaft on the auxiliary arm.

Preferably, the fixing shaft passes through the mounting hole, and is connected to a fastener to fixedly connect the main arm to the auxiliary arm.

To achieve the above objective, the present application further provides a vehicle, comprising the height sensor as described above.

Compared with the prior art, because a structure enabling adjustment between the main arm and auxiliary arm is used in the height sensor and vehicle comprising same provided in the present application, different swing arms can share the same set of molds for producing the main arm and auxiliary arm, so versatility is high. For different height sensors, all that need be done is to flexibly assemble the main arm and auxiliary arm according to different swing arm working length requirements, so configuration is flexible and the structure is simple and rational. Thus, the shortcomings of existing swing arms are avoided, namely, the fact that the length is fixed, and the need to develop different swing arms and molds for different vehicle models. Thus, the development costs are greatly reduced while the development efficiency is increased.

DETAILED DESCRIPTION

Embodiments of the present application are explained further below with reference to the drawings.

Many specific details are expounded in the following description so that those skilled in the art can understand the present application more comprehensively. However, it will be understood to those skilled in the art that the present application can be realized without either of these specific details. In addition, it should be understood that the present application is not limited to the specific embodiments described. On the contrary, consideration may be given to the use of any combination of the following features and key elements to implement the present application, regardless of whether they relate to different embodiments. Therefore, the following aspects, characteristics, embodiments and advantages only serve an illustrative purpose, and should not be regarded as key elements or limitations of the claims, unless expressly specified in the claims. Furthermore, if words indicating direction such as up/down/left/right, upper side, lower side, etc. appear herein, this is purely for convenience of expression in accordance with the relative positions of components in the current drawings, and should not be interpreted as limiting the scope of protection.

Figure 1:
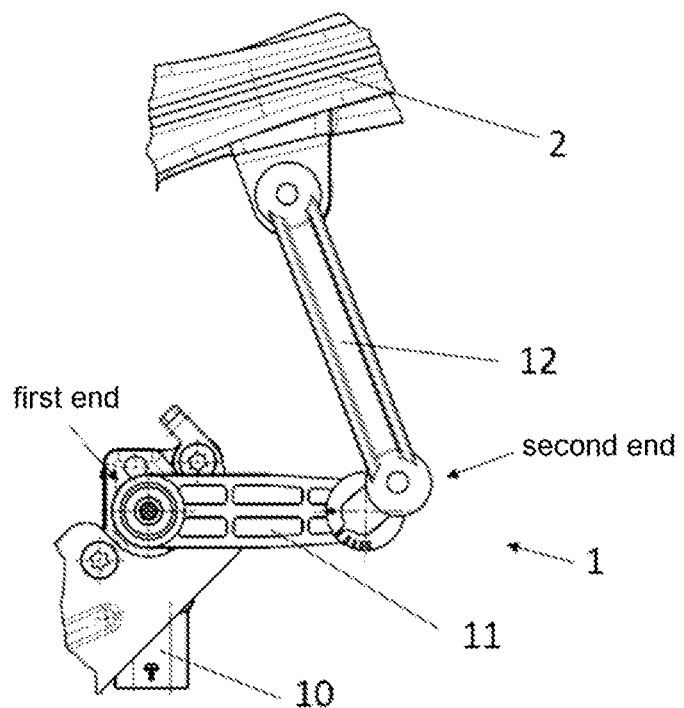
FIG. 1 is a schematic drawing of an operating state of a height sensor in an embodiment of the present application.
Figure 2:
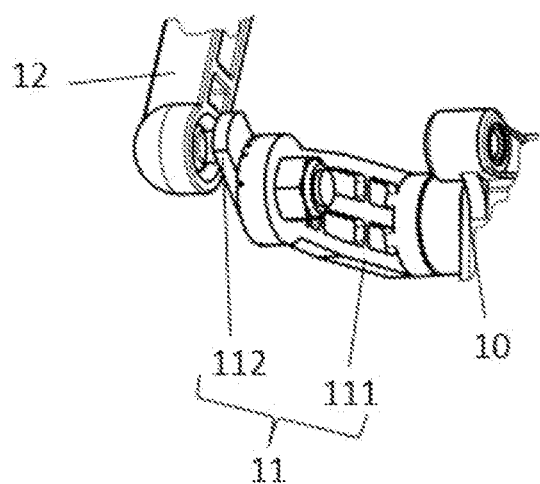
FIG. 2 is a schematic drawing of part of the structure at the back of the height sensor in FIG. 1.

FIG. 1 is a schematic drawing of an operating state of a height sensor in an embodiment of the present application; FIG. 2 is a schematic drawing of part of the structure at the back of the height sensor in FIG. 1.

Referring to FIGS. 1 and 2, the present application provides a height sensor 1, mounted between a vehicle chassis and a chassis suspension 2 for example, and used to measure changes in motor vehicle chassis height. The height sensor 1 comprises a sensor body 10, a swing arm 11 and a connecting rod 12. A first end of the swing arm 11 is rotatably connected to the sensor body 10, such that the swing arm 11 can swing relative to the sensor body 10. A second end of the swing arm 11 is movably connected to the connecting rod 12. As shown in FIG. 2, in this embodiment, the second end of the swing arm 11 is connected to the connecting rod 12 via a ball joint formed by a movable ball head and ball socket. When the chassis height changes as the vehicle is driven, the chassis suspension 2 drives the connecting rod 12 to move; the movement of the connecting rod 12 drives the swing arm 11 to swing relative to the sensor body 10; a detection element in the sensor body 10 can measure chassis height change data according to the swing angle and direction of the swing arm 11, and this data is provided to a vehicle control unit in order to implement further control of the vehicle.

Figure 3:
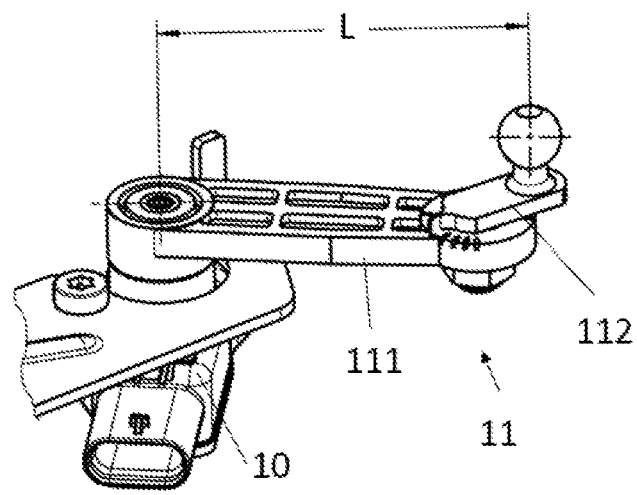
FIG. 3 is a schematic drawing of the swing arm of the height sensor in an embodiment of the present application.
Figure 4A:
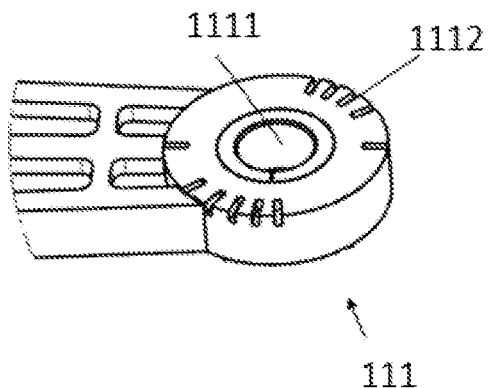
FIG. 4A is a structural schematic drawing of the end of the main arm in FIG. 3 that is connected to the auxiliary arm.

FIG. 3 is a schematic drawing of the swing arm of the height sensor in an embodiment of the present application; FIG. 4A is a structural schematic drawing of the end of the main arm in FIG. 3 that is connected to the auxiliary arm; and FIG. 4B is a structural schematic drawing of the auxiliary arm in FIG. 3.

Figure 4B:
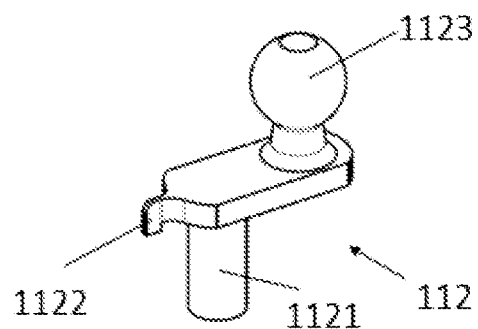
FIG. 4B is a structural schematic drawing of the auxiliary arm in FIG. 3.

Referring to FIGS. 3, 4A and 4B, furthermore, the swing arm 11 comprises a main arm 111 and an auxiliary arm 112. One end of the main arm 111 is fixedly connected to the auxiliary arm 112; the other end of the main arm 111 (i.e. the first end of the swing arm 11) is rotatably connected to the sensor body 10. The connecting end of the main arm 111 that is connected to the auxiliary arm 112 is provided with a mounting hole 1111, and multiple limiting slots 1112 are provided around the mounting hole 1111, the multiple limiting slots 1112 being arranged to surround the mounting hole 1111. A fixing shaft 1121, a limiting protrusion 1122 and a ball head 1123 are provided on the auxiliary arm 112. The fixing shaft 1121 can be inserted into the mounting hole 1111 in the main arm 111, and can rotate in the mounting hole 1111. The limiting protrusion 1122 can be engaged in the limiting slots 1112 on the main arm 111, to limit the angle and position of rotation of the auxiliary arm 112 around the axis along which the fixing shaft 1121 lies. That is to say, when the auxiliary arm 112 rotates to different positions, the limiting protrusion 1122 is engaged in the limiting slots 1112 at corresponding different positions, to limit rotation of the auxiliary arm 112. The ball head 1123 is movably connected to a ball socket provided on the connecting rod 12; in other embodiments, the positions where the ball head and ball socket are arranged may also be exchanged. Furthermore, the positions of the limiting protrusion 1122 and the ball head 1123 on the auxiliary arm 112 are at two sides of the fixing shaft 1121 respectively, and the protrusion direction of the ball head 1123 on the auxiliary arm 112 is opposite to the protrusion direction of the limiting protrusion 1122 and the fixing shaft 1121.

Figure 5A:
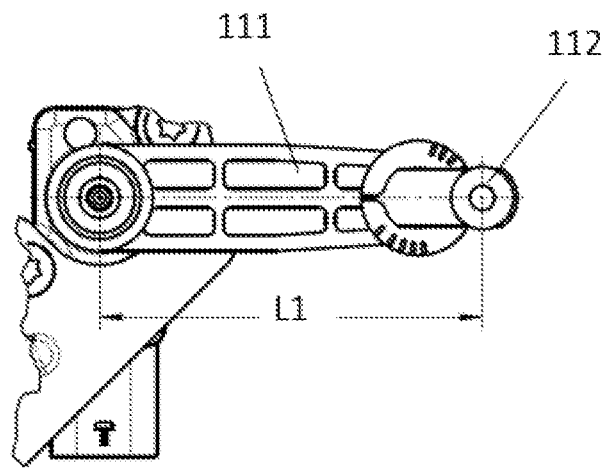
FIGS. 5A and 5B are schematic drawings of the swing arm of the height sensor with different working lengths in embodiments of the present application.
Figure 5B:
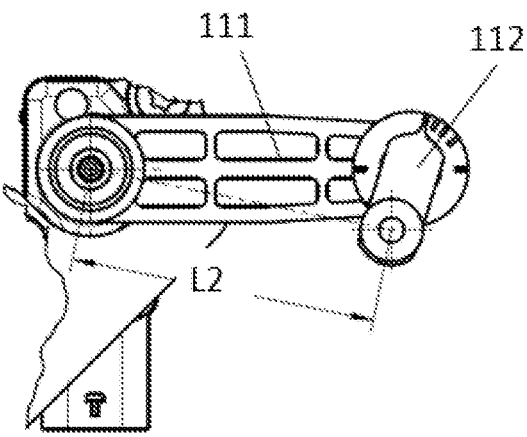

FIGS. 5A and 5B are schematic drawings of the swing arm of the height sensor with different working lengths in embodiments of the present application.

Referring to FIG. 3, the straight-line distance L between the center line of rotation of the swing arm 11 relative to the sensor body 10 and the center line of rotation of the connecting rod 12 relative to the swing arm 11 (i.e. the center line of the ball head on the auxiliary arm 112) is defined as the working length L of the swing arm 11. The working length L can be adjusted according to the requirements of different vehicle operating conditions, by adjusting the cooperative connection relationship between the auxiliary arm 112 and the main arm 111 on the swing arm 11. For example, in this embodiment, referring to FIGS. 5A and 5B, the working length L of the swing arm 11 of the height sensor 1 used on the vehicle model is determined according to the requirements of the actual vehicle chassis mounting conditions, and the mounting position of the auxiliary arm 112 relative to the main arm 111 is determined according to the working length L of the swing arm 11.

FIG. 5A corresponds to a height sensor configuration for one vehicle model, while FIG. 5B corresponds to a height sensor configuration for another vehicle model. The swing arm working lengths L1 and L2 of the two vehicle models have different requirements, and the corresponding mounting angles and positions of the auxiliary arm 112 relative to the main arm 111 are different. That is to say, after the fixing shaft 1121 of the auxiliary arm 112 has been inserted into the mounting hole 1111 in the main arm 111, the limiting protrusion 1122 on the auxiliary arm 112 is engaged in the limiting slot 1112 on the main arm 111 at different positions corresponding to the different working lengths L. The main arm 111 is then fixed to the auxiliary arm 112; for example, in this embodiment, a fastener such as a nut is used for connection and fixing to the fixing shaft 1121. In other embodiments, another method may be used to fix the main arm 111 to the auxiliary arm 112.

The use of a structural arrangement enabling adjustment between the main arm 111 and the auxiliary arm 112 in the present application enables the working length L of the swing arm 11 to be flexibly configured according to the needs of actual operating conditions, thus greatly increasing the versatility of the height sensor. Different swing arms can share the same set of molds for producing the main arm and auxiliary arm, and all that need be done is to assemble them flexibly according to different required working lengths L, thus avoiding the shortcomings of existing swing arms, namely, the fact that the length is fixed, and the need to develop swing arms and moulds of different lengths for different vehicle model operating conditions.

Although the present application has been described above through the embodiments, the present application is not limited to the embodiments. Various changes and modifications made by any person skilled in the art without departing from the spirit and scope of the present application shall be included in the scope of protection of the present application, and therefore the scope of protection of the present application shall be the scope defined by the claims.

The invention claimed is:

1. A height sensor, comprising:
a sensor body;
a swing arm comprising a main arm and an auxiliary arm rotatably coupled to the main arm; and
a connecting rod,
wherein a first end of the main arm is movably connected to the sensor body,
wherein an end of auxiliary arm is movably connected to the connecting rod, and
wherein the auxiliary arm comprises a structure configured to rotatably couple the auxiliary arm to the main arm and provide an adjustable working length of the swing arm by rotatably adjusting a second end of the auxiliary arm relative to the first end of the main arm,
a limiting protrusion disposed at the second end of the auxiliary arm, the limiting protrusion configured to engage with multiple limiting slots to set a position of rotation of the auxiliary arm relative to the main arm.

2. The height sensor as claimed in claim 1, wherein the main arm comprises a mounting hole provided at the first end of the main arm; and the multiple limiting slots are provided around the mounting hole.

3. The height sensor as claimed in claim 2, wherein the multiple limiting slots are arranged to surround the mounting hole.

4. A height sensor, comprising:
a sensor body;
a swing arm; and
a connecting rod,
wherein a first end of the swing arm is movably connected to the sensor body,
wherein a second end of the swing arm is movably connected to the connecting rod,
wherein the swing arm comprises a structure with an adjustable working length,
wherein the swing arm further comprises:
a main arm;
an auxiliary arm; and
a cooperative connection relationship between the main arm and the auxiliary arm configured to adjust the working length of the swing arm,
wherein a first end of the main arm is connected to the auxiliary arm, a second end of the main arm is connected to the sensor body,
wherein the auxiliary arm is movably connected to the connecting rod,
wherein the cooperative connection relationship comprises a relative assembly angle or assembly position between the main arm and the auxiliary arm,
wherein the first end of the main arm connected to the auxiliary arm is provided with a mounting hole,
wherein the main arm comprises multiple limiting slots provided around the mounting hole wherein the first end of the main arm connected to the auxiliary arm is provided with a mounting hole,
wherein the main arm comprises multiple limiting slots provided around the mounting hole,
wherein the multiple limiting slots are arranged to surround the mounting hole,
wherein the auxiliary arm comprises:
a fixing shaft; and
a limiting protrusion,
wherein the fixing shaft is connected to the mounting hole in the main arm in a cooperative manner,
wherein the limiting protrusion is connected to one of the multiple limiting slots on the main arm by engagement, and
wherein the working length of the swing arm is adjustable by adjusting an angle of rotation of the auxiliary arm relative to the main arm about the fixing shaft.

5. The height sensor as claimed in claim 4, wherein the auxiliary arm comprises one of a ball head or a ball socket,
wherein the connecting rod comprises one of the ball head or the ball socket that is not provided on the auxiliary arm, and
wherein the ball head or ball socket of the auxiliary arm is movably connected to the one of the ball socket or ball head correspondingly provided on the connecting rod.

6. The height sensor as claimed in claim 5, wherein the positions of the limiting protrusion and the ball head or ball socket on the auxiliary arm are at two sides of the fixing shaft respectively, and the protrusion direction of the ball head or ball socket on the auxiliary arm is opposite to the protrusion direction of the limiting protrusion and the fixing shaft on the auxiliary arm.

7. The height sensor as claimed in claim 4, wherein the fixing shaft passes through the mounting hole, and the fixing shaft is connected to a fastener to fixedly connect the main arm to the auxiliary arm.

8. A height sensor, comprising:
a sensor body;
a swing arm, the swing arm comprising:
a main arm, the main arm comprising:
a first end of the main arm rotatably connected to the sensor body; and
a second end of the main arm, the second end of the main arm comprising:
a mounting hole disposed within a central portion of the second end of the main arm; and
a plurality of limiting slots disposed around a periphery of the second end of the main arm surrounding the mounting hole; and
an auxiliary arm, the auxiliary arm comprising:
a fixing shaft disposed at a first end of the auxiliary arm, the fixing shaft extending perpendicularly away from the auxiliary arm and through the mounting hole; and
a limiting protrusion disposed at the first end of the auxiliary arm, the limiting protrusion configured to engage with the plurality of limiting slots to set a position of rotation of the auxiliary arm around a rotation axis of the fixing shaft; and
a connecting rod rotatably connected to a second end of the auxiliary arm.

9. The height sensor as claimed in claim 8, wherein the auxiliary arm further comprises a ball head disposed at a second end of the auxiliary arm, and
wherein the connecting rod comprises a ball socket movably connected to the ball head.

10. The height sensor as claimed in claim 8, wherein the auxiliary arm further comprises a ball socket disposed at a second end of the auxiliary arm, and
wherein the connecting rod comprises a ball head movably connected to the ball socket.

11. The height sensor as claimed in claim 8, wherein the auxiliary arm further comprises a fastener connected to the fixing shaft to fixedly couple the main arm to the auxiliary arm.

* * * * *